(12) United States Patent
Kim (10) Patent No.: US 6,208,614 B1
(45) Date of Patent: Mar. 27, 2001

(54) INFORMATION RECORDING MEDIUM HAVING SAME-PHASE WOBBLING AREAS AND DIFFERENT-PHASE WOBBLING AREAS

(75) Inventor: Dae Young Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/134,368

(22) Filed: Aug. 14, 1998

(30) Foreign Application Priority Data

Aug. 16, 1997 (KR) .................................................. 97-39054
Nov. 1, 1997 (KR) .................................................. 97-57619

(51) Int. Cl.[7] ...................................................... G11B 7/00
(52) U.S. Cl. ...................................... 369/275.4; 369/44.13
(58) Field of Search ............................. 369/44.13, 275.2, 369/275.3, 275.4, 47

(56) References Cited

U.S. PATENT DOCUMENTS

| | | | | |
|---|---|---|---|---|
| 5,936,933 | * | 8/1999 | Miyamoto et al. | 369/275.3 |
| 6,064,643 | * | 5/2000 | Tanoue et al. | 369/275.3 |
| 6,069,870 | * | 5/2000 | Maeda et al. | 369/275.3 |

* cited by examiner

Primary Examiner—Nabil Hindi (57) ABSTRACT

A recording medium that is adapted to maximize the recording capacity and to simplify the configuration of an information recording/reproducing apparatus including a pickup. In the medium, a different type of wobbling signals are preformatted in each of the adjacent land and groove signal tracks. A same-phase wobbling signal provided by wobbling each side of the respective land and groove signal tracks in the same phase and a different-phase wobbling signal provided by wobbling each side of the respective land and groove signal tracks in a different phase are used as the different type of wobbling signals. The physical positions of all the land and groove signal tracks are indicated by the same-phase wobbling signal.

15 Claims, 11 Drawing Sheets

INFORMATION RECORDING MEDIUM HAVING SAME-PHASE WOBBLING AREAS AND DIFFERENT-PHASE WOBBLING AREAS

BACKGROUND OF THE INVENTION

1. Field of the Invention

This invention relates to a recording medium having land and groove tracks, and more particularly to a recording medium that is adapted to record an information on both the land tracks and the groove tracks.

2. Description of the Prior Art

Recently, an optical recording medium, an optical magnetic recording medium and so on have been developed as a recording medium for recording various information such as video and audio information, etc. and are commercially available in the market. Such an optical recording medium includes a read-only type disc such as CD, CD-ROM, DVD-ROM, etc., a write-once-read-many type disc such as CD-R, DVD-R, etc., and a rewritable type disc such as CD-RW, DVD-RAM, etc.

In the conventional rewritable disc, it is previously recorded an identified (hereinafter "ID") information including an address (or position) information allowing an information to be recorded in the desired position. Actually, the optical disc such as CD-R, etc., as shown FIG. 1, includes a land and groove signal tracks 10 and 12 formed thereon. Also, the ID information including the address information, etc. is preformatted on the optical disc by wobbling the groove track 12 in accordance with a carrier which the ID information is frequency-modulated.

Figure 1:
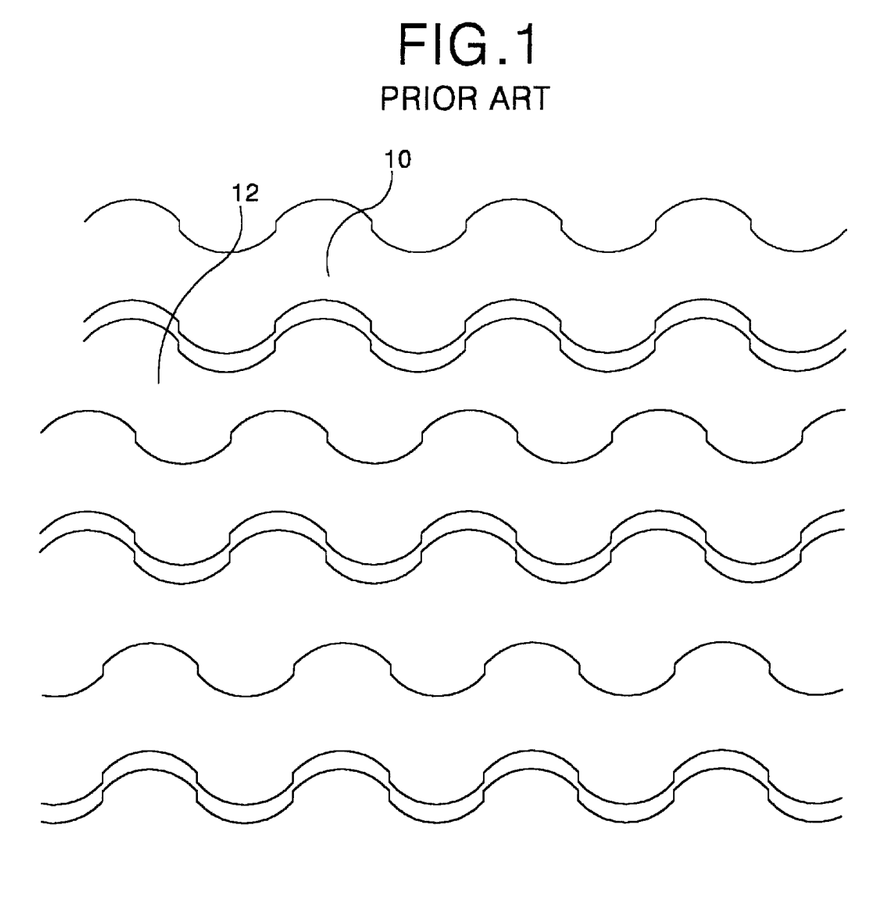
FIG. 1 is a schematic view showing a signal track structure of a CD-R disc.

The address information can be obtained from a wobbling signal picked-up from the wobbled groove signal track 12 and the information can be recorded at the desired position on the disc by the obtained address information. In the optical disc having such structure, a recording capacity is limited because the information is recorded on only the groove track 12.

Figure 2:
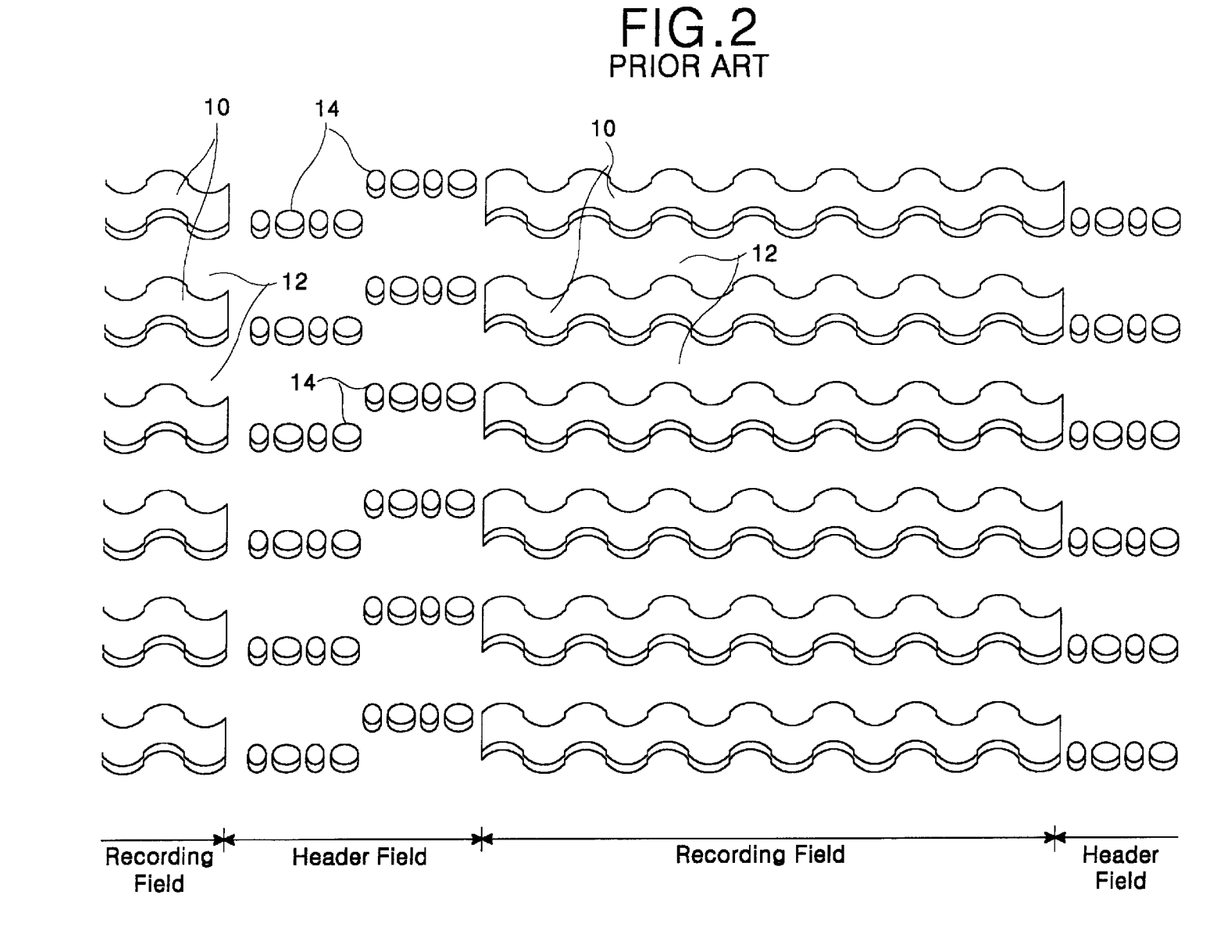
FIG. 2 is a schematic view showing a signal track structure of a DVD-RAM disc.

Also, an optical disc such as DVD-RAM and so on, as shown FIG. 2, is known as the information can be recorded on all of land and groove signal tracks 10 and 12. The optical disc comprises a header field having the ID information of address information, etc. recorded in a pre-pit train and a recording field consisting of any one of the land and groove signal track 10 and 12 wobbled in the same phase. In this disc, since the information can be not recorded on the header field consisting of the pre-pit train, the recording capacity is limited. As described above, the prior recording medium make to decrease an amount of information to be recorded on recordable area.

SUMMARY OF THE INVENTION

Accordingly, it is an object of the present invention to provide a recording medium that is capable of increasing an amount of recordable information.

It is other object of the present invention to provide a recording medium that is capable of maximizing an amount of information to be recorded on all of the land and groove signal tracks.

It is another object of the present invention to provide an information recording and reproducing apparatus that is capable of performing information record and reproduction for the above recording medium.

In order to achieve this and other objects of the invention, a recording medium according to the present invention includes a signal track being wobbled in a predetermined frequency and having first and second wobbling areas. First wobbling area comprises a readable identified information, while second wobbling area has a non-readable identified information. Also, first and second wobbling areas is alternatively arranged.

BRIEF DESCRIPTION OF THE DRAWINGS

This and other objects of the invention will be apparent from the following detailed description of the embodiments of the present invention with reference to the accompanying drawings, in which.

DETAILED DESCRIPTION OF THE PREFERRED EMBODIMENT

Figure 3:
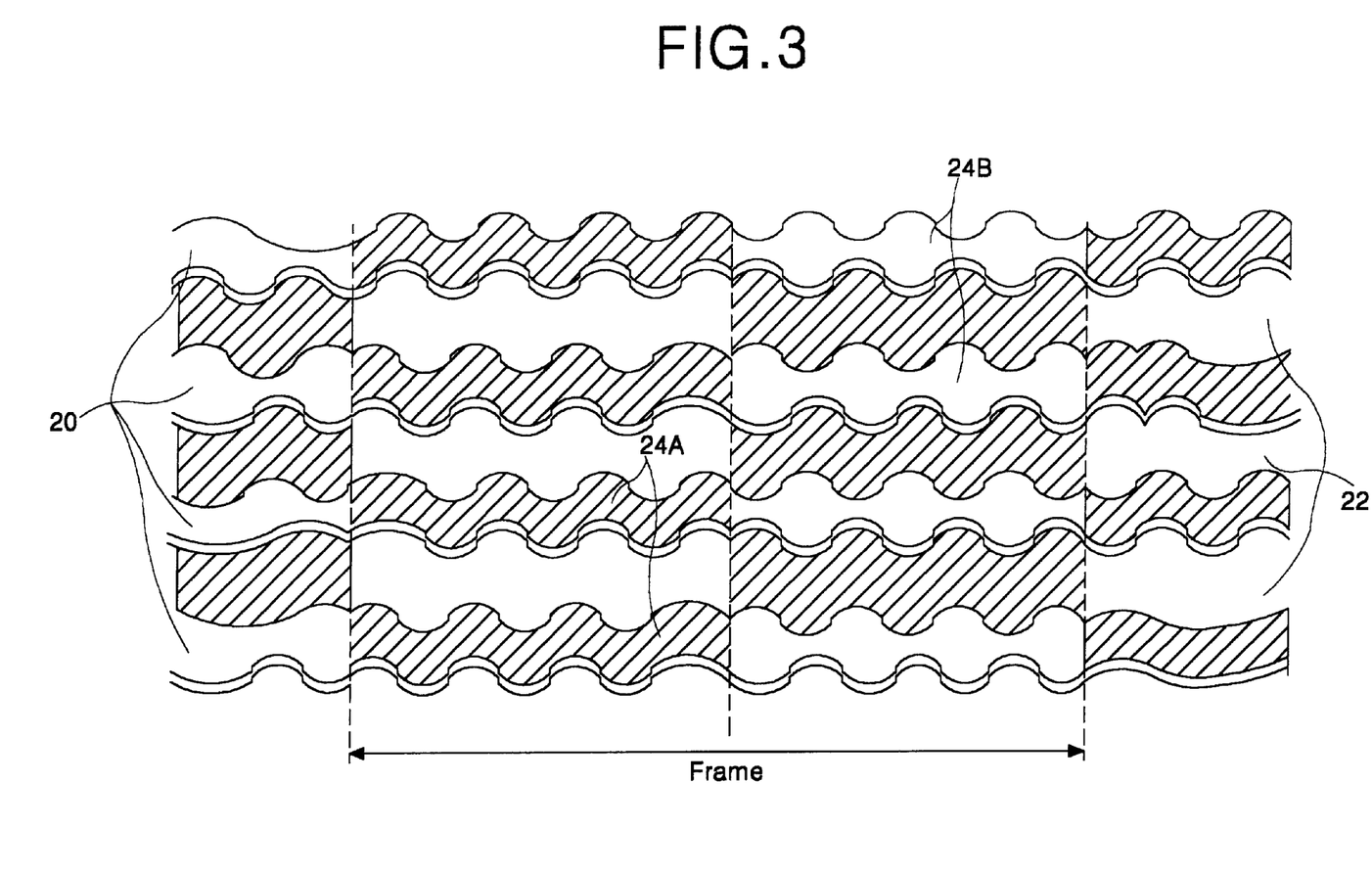
FIG. 3 is a schematic view showing a signal track structure of an optical disc according to an embodiment of the present invention.
Figure 4:
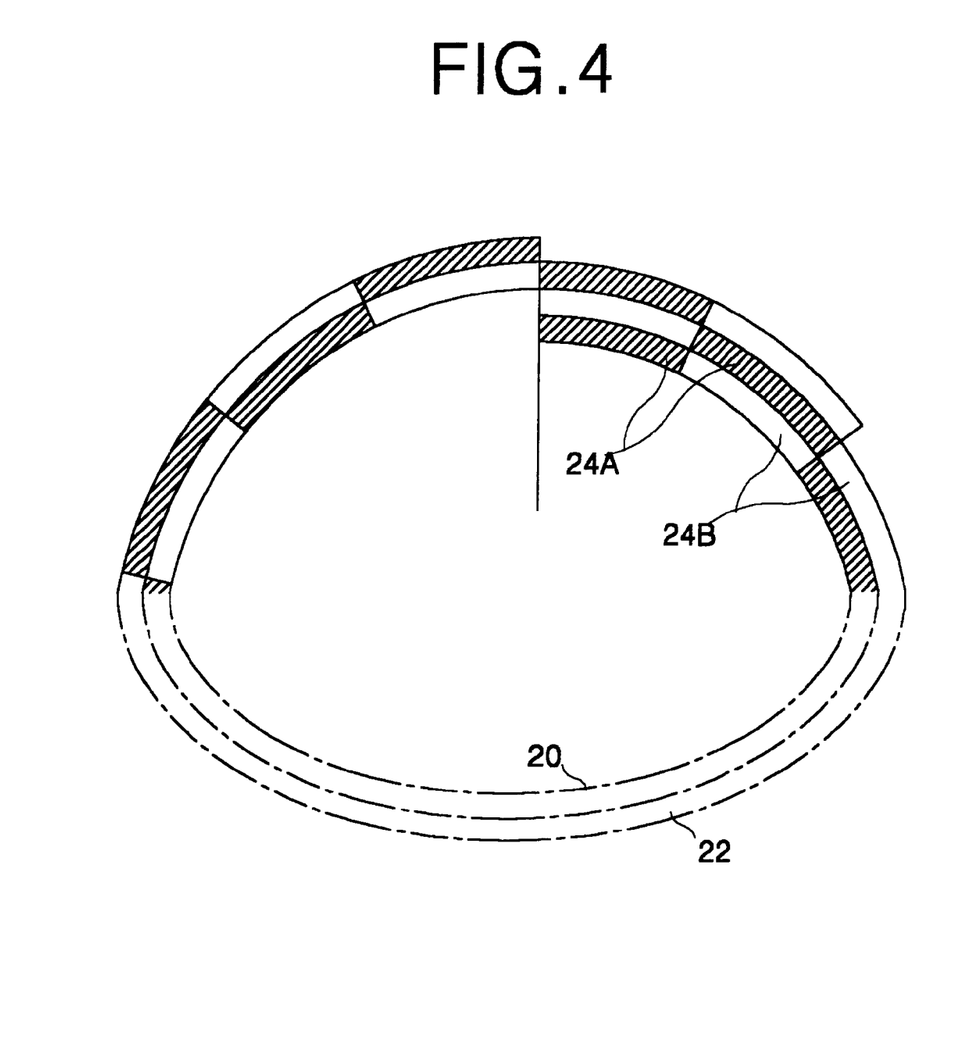
FIG. 4 is a schematic view showing a signal track structure of a two-spiral type optical disc according to an embodiment of the present invention.
Figure 5:
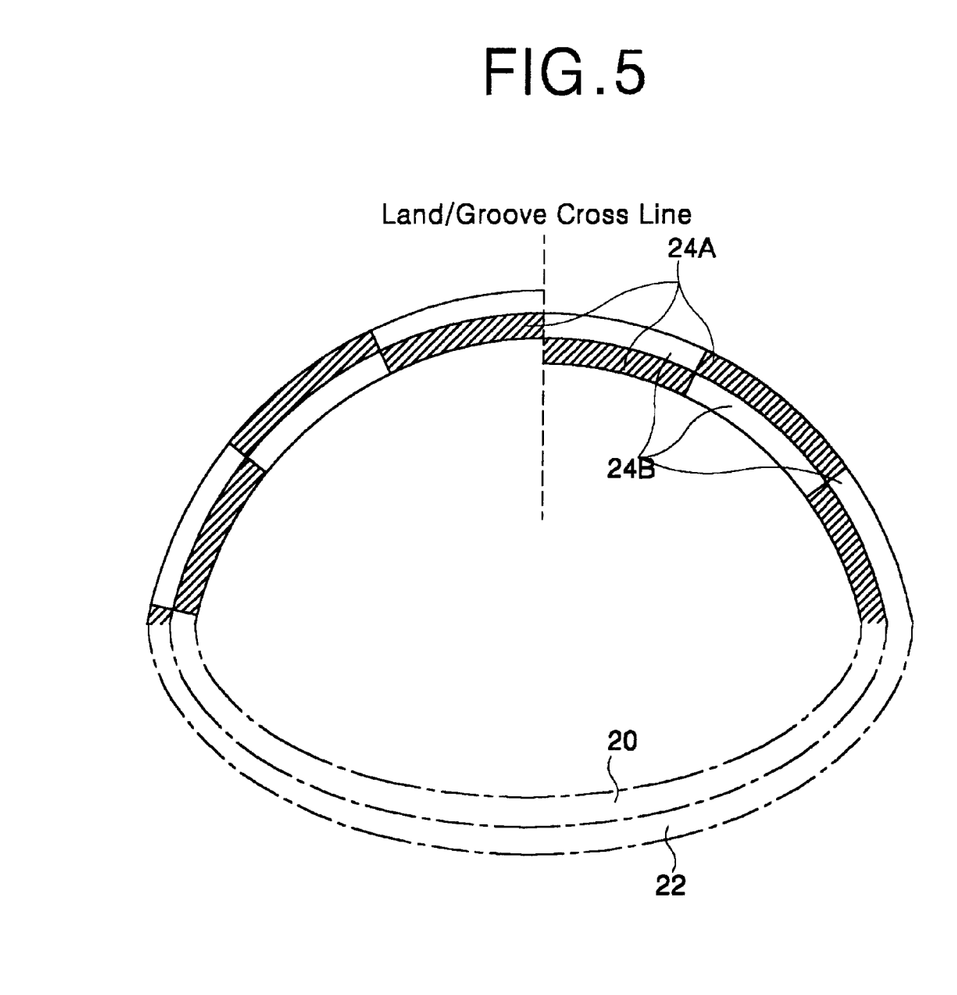
FIG. 5 is a schematic view showing a signal track structure of an one-spiral type optical disc according to an embodiment of the present invention.

Referring to FIG. 3, there is shown an optical disc according to an embodiment of the present invention having land and groove signal tracks 20 and 22. The land and groove signal tracks 20 and 22 are defined in parallel in a spiral pattern from the innermost circumference to the outermost circumference of the optical disc as shown in FIG. 4, or arranged alternately every rotation period from the innermost circumference to the outermost circumference in such a manner to form one spiral signal track as shown in FIG. 5. Each of land and groove signal tracks 20 and 22 includes same-phase wobbling areas 24A and different-phase wobbling areas 24B that intersect at every predetermined region and appear alternately in the circumference direction i.e., the proceeding direction of the respective track. These same-phase wobbling areas 24A alternate with the difference-phase wobbling areas 24B in the diameter direction i.e., the width direction of the land and groove track 20 and 22. In the same-phase wobbling area 24A represented by the oblique lines in FIG. 3, being preformatted with ID information including an address information, etc. thereon, each side of the respective land and groove signal tracks 20 and 22 is wobbled to have the same-phase in accordance with carrier which ID information is frequency-modulated. Each side of the difference-phase wobbling areas 24B is wobbled to have the difference phase by alternating the difference-phase wobbling areas 24B with the same-phase wobbling areas 24A in both the proceeding direction and the width direction of the signal tracks 20 and 22. As a result, the address information can be obtained from a wobbling signal on only same-phase wobbling area 24A. For example, if a pair of the same-phase area 24A and the difference-phase wobbling area 24B is used for an information recording unit i.e., one frame as shown FIG. 3, the address information is readout from only the same-phase wobbling area 24A positioned in front and back of the difference-phase wobbling area 24B so that an user information is recorded in the information recording unit on the basis of the readout address information. Therefore, in the recording medium having such structure, the information can be recorded on all of the land and groove signal tracks 20 and 22, furthermore all of recordable areas is used.

Figure 6:
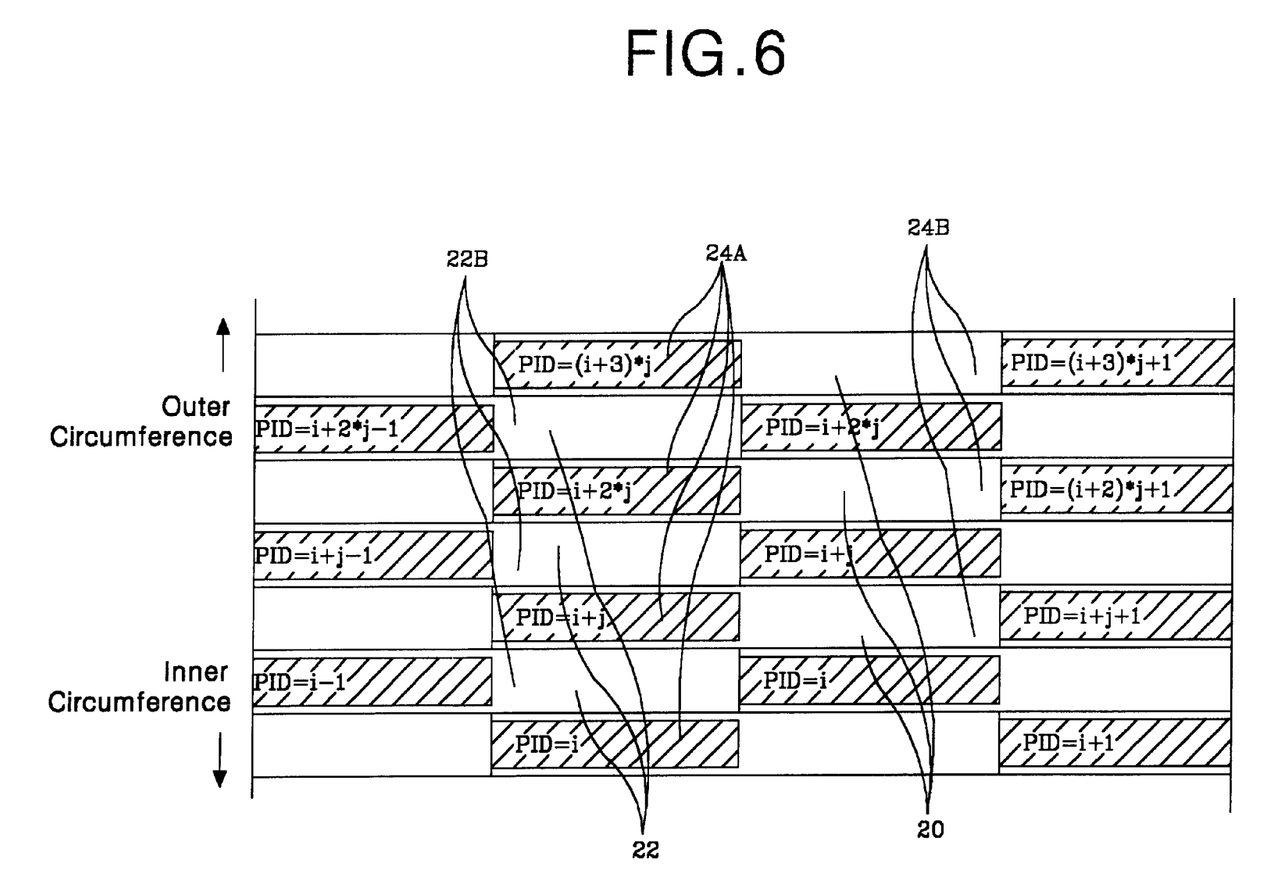
FIG. 6 is a view for explaining a changing state in frame IDs preformatted in signal tracks of the optical disc shown in FIG. 4.
Figure 7:
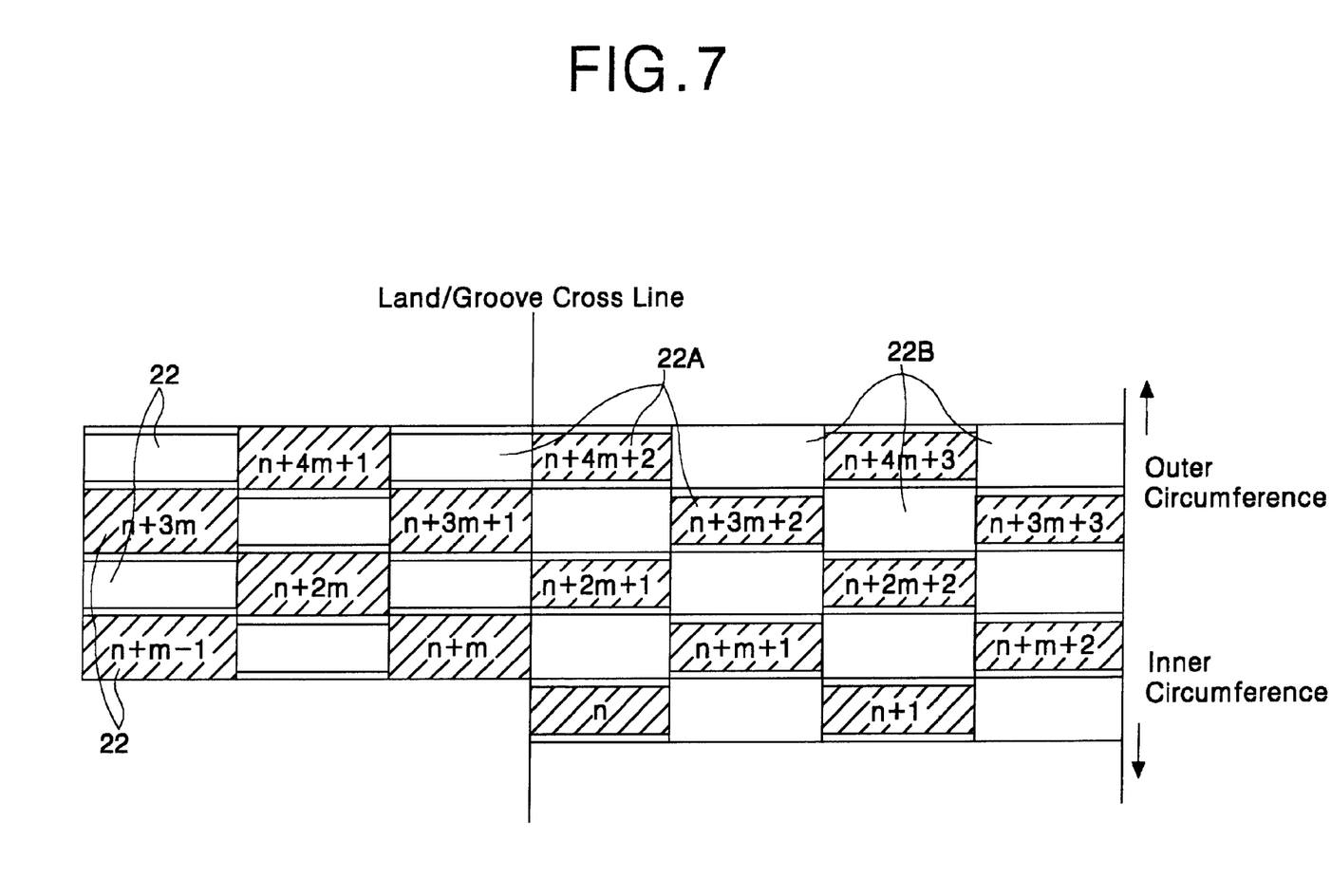
FIG. 7 is a view for explaining a changing state in frame IDs preformatted in signal tracks of the optical disc shown in FIG. 5.

FIG. 4 shows an optical disc, wherein the land and groove tracks 20 and 22 as shown in FIG. 3 are defined in parallel in a spiral shape. In the diameter direction, the same-phase wobbling area 24A is positioned in only the land signal track 20 or the groove signal track 22 and the different-phase wobbling area 24B is positioned in only the groove signal track 22 or the land signal track 20. In other words, the same-phase wobbling area 24A and the different-phase wobbling area 24B appear alternately in both the circumference direction and the diameter direction. j same-phase wobbling areas 24A and j different-phase wobbling areas 24B are alternately arranged in each of the land and groove signal tracks 20 and 22 for one turn to divide the signal track 20 and 22 for one turn into j frames. As shown in FIG. 6, the same-phase wobbling areas 24A formed in the land signal track 20 have sequentially increasing frame identification codes PIDs, respectively. Likewise, the same-phase wobbling areas 24A formed in the groove track 22 also have sequentially increasing frame identification codes PIDs, respectively.

FIG. 5 shows an optical disc, wherein the ID information of the address information, etc. is preformatted on each of the land and groove tracks 20 and 22 which is alternated by one turn to make single spiral shape, as shown in FIG. 4. In FIG. 5, the single signal track is changed from the land signal track 20 to the groove signal track 22 or from the groove signal track 22 to the land signal track 20 on the basis of a land/groove cross line. Also, the same-phase wobbling area 24A and the difference-phase wobbling area 24B are alternatively arranged in each of the land and groove signal tracks 20 and 22. In the diameter, the same-phase wobbling area 24A is positioned in only the land signal track 20 or the groove signal track 22 and the different-phase wobbling area 24B is positioned in only the groove signal track 22 or the land signal track 20. That is, the same-phase wobbling area 24A and the different-phase wobbling area 24B appear alternately in both the circumference direction and the diameter direction. In order to alternate the same-phase wobbling area 24A and the difference-phase wobbling area 24B in the diameter direction, the same-phase wobbling areas 24A and the difference-phase wobbling areas 24B included in each of the signal tracks 20 and 22 for one turn is increased by one in the number as the signal tracks 20 and 22 are proceeded from inner circumference to outer circumference. For example, in the signal tracks 20 and 22 for two turns (i.e., a pair of land and groove signal tracks 20 and 22), 2m+1 same-phase wobbling areas 24A and 2m+1 difference-phase wobbling areas exist. That is, 2m+1 frames exist. Therefore, in the signal track 20 or 22 for one turn, any one area of both areas is m+1 and the other area is m. Furthermore, if the signal tracks 20 and 22 for two turns (i.e., a pair of land and groove signal tracks 20 and 22) are divided into 7 frames, m is 3 and so the same-phase wobbling area 24A and the difference-phase wobbling area 24B exist by 7, respectively. In detail, 4(=m+1) same-phase wobbling areas 24A and 3(=m) difference-phase wobbling areas 24B are arranged in the signal track for first one turn (i.e., in the land signal track 20) and 3(=m) same-phase wobbling areas 24A and 4(=m+1) difference-phase wobbling areas 24B are positioned in the signal track for second one turn (i.e., in the groove signal track 22).

Figure 8:
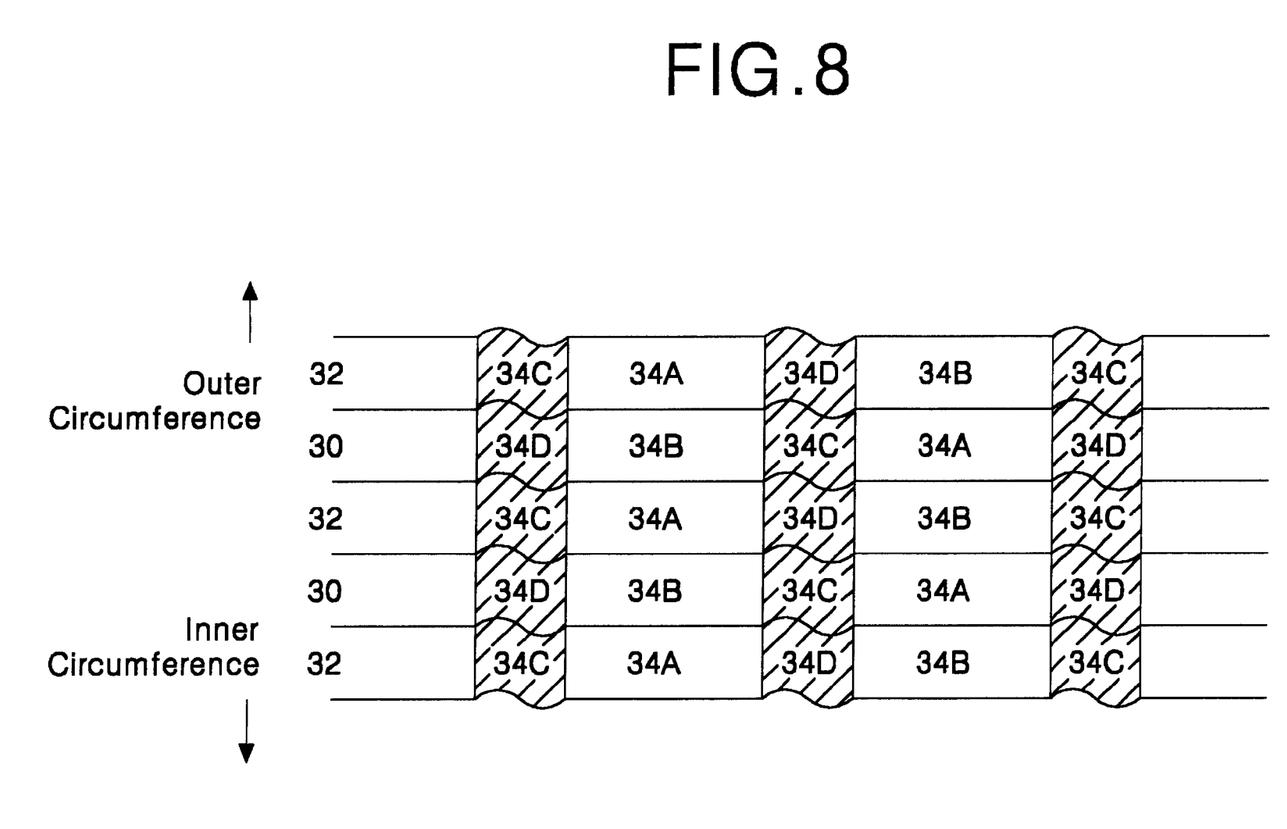
FIG. 8 is a schematic view showing a signal track structure of an optical disc according to another embodiment of the present invention.

Referring now to FIG. 8, there is shown an optical disc according to another embodiment of the present invention having land and groove signal tracks 30 and 32. The optical disc of FIG. 8 includes the same-phase wobbling area 34A and difference-phase wobbling area 34B such as in FIG. 3 and further comprises a pre-wobbling area 34C and post-wobbling area 34D which a synchronous pattern is preformatted in each front of the same-phase wobbling area 34A and the difference wobbling area 34B. The pre-wobbling area 34C and post-wobbling area 34D are formed on both the land and groove signal tracks 30 and 32 in same format. That is, the pre-wobbling area 34C and the post-wobbling area 34D have the same phase without regarding to the land and groove signal tracks 30 and 32. Also, in each of the pre-wobbling area 34C and post-wobbling area 34D, the different synchronous patterns each other, i.e. logical values having a complementary relationship are respectively preformatted. Since the land and groove tracks 30 and 32 have optical characteristics contrary to each other and the pre-wobbling area 34C and post-wobbling area 34D are alternatively arranged in the width direction of the signal tracks 30 and 32, signals having phases contrary to each other are detected from each of the pre-wobbling area 34C and the post-wobbling area 34D having the same phase. In detail, the synchronous patterns preformatted on the pre-wobbling areas 34C represented by oblique lines in FIG. 8 have the same logical value, likewise the synchronous patterns preformatted on post-wobbling areas 34D represented not by oblique lines also have the same logical value. Contrarily, the synchronous patterns on the pre-wobbling area 34C represented by the oblique lines and on the post-wobbling area 34D represented not by the oblique lines have logical values in the complementary relationship, respectively. The synchronous patterns preformatted on the pre-wobbling area 34C and on the post-wobbling area 34D indicate reference points for each of the same-phase wobbling area and the difference-phase wobbling area 34D.

Figure 9:
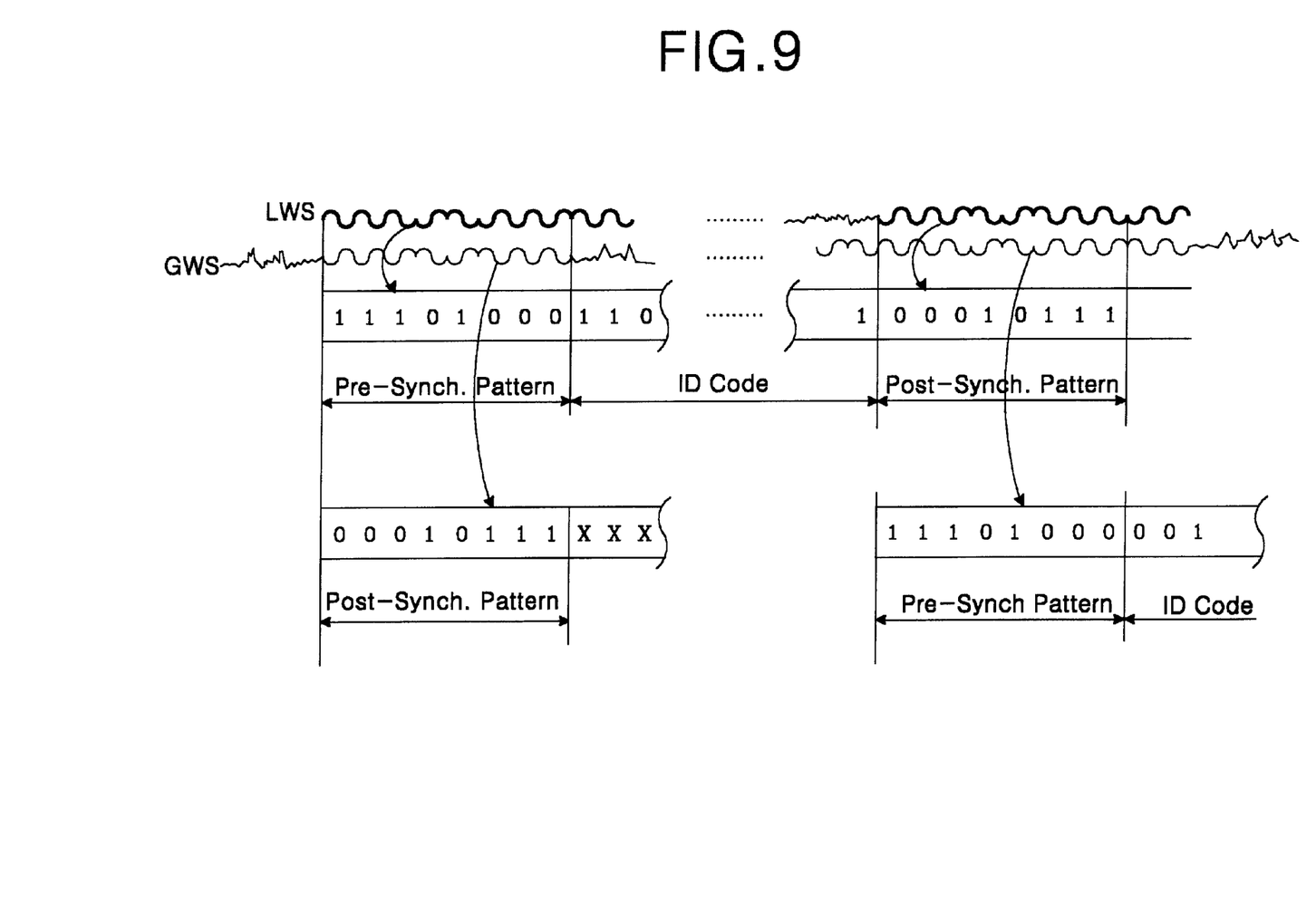
FIG. 9 illustrates wobbling signals detected from the optical disc having the signal track structure in FIG. 9 and synchronous patterns and identification codes decoded with the wobbling signals.

FIG. 9 illustrates the synchronous patterns detected from the pre-wobbling area 34C and the post-wobbling area 34D as shown in FIG. 8. A pre-synchronous pattern is detected from the pre-wobbling area 34C and a post-synchronous pattern is obtained from the post-wobbling area 34D. A LWS is a wobbling signal detected from the land signal track 30 and a GWS is a wobbling signal detected from the groove signal track 32. These wobbling signals LWS and GWS include a pre-synchronous component detected from the pre-wobbling area 34C and a post-synchronous component detected from the post-wobbling area 34D, wherein the pre-synchronous component and the post-synchronous component have the phases contrary to each other, respectively. The pre-synchronous pattern of "00010111" and the post-synchronous pattern of "11101000" are obtained by demodulating the pre-synchronous component and post-synchronous component. In other words, the pre-synchronous pattern and the post-synchronous pattern are readout from each of the land and groove signal tracks 30 and 32 adjacent to each other. These synchronous patterns is preformatted on the signal tracks 30 and 32 so that it is effectively performed the access of the optical disc.

Figure 10:
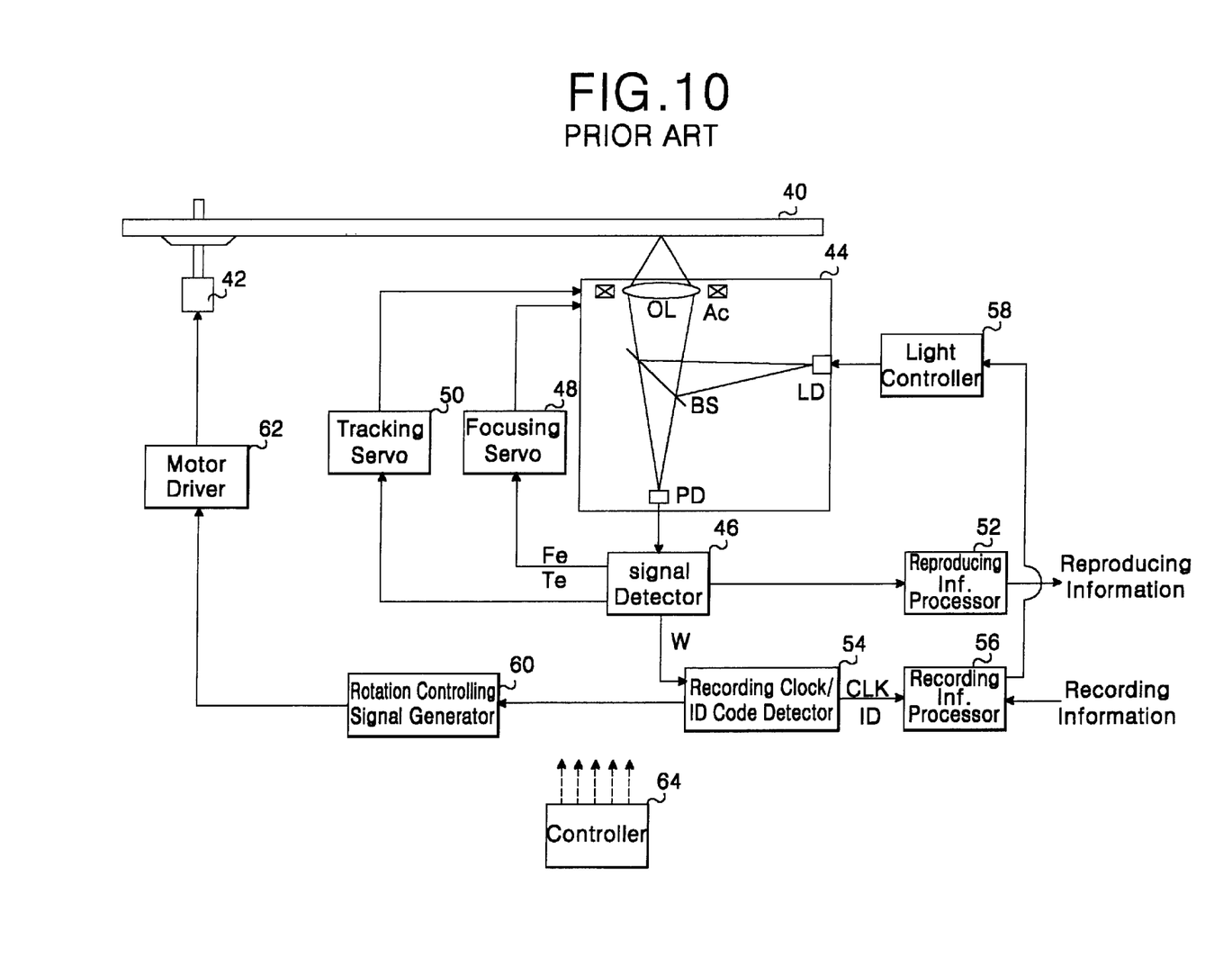
FIG. 10 is a schematic view showing a conventional information recording/reproducing apparatus for accessing an optical disc having the signal track structure in FIG. 1 or FIG. 2.
Figure 11:
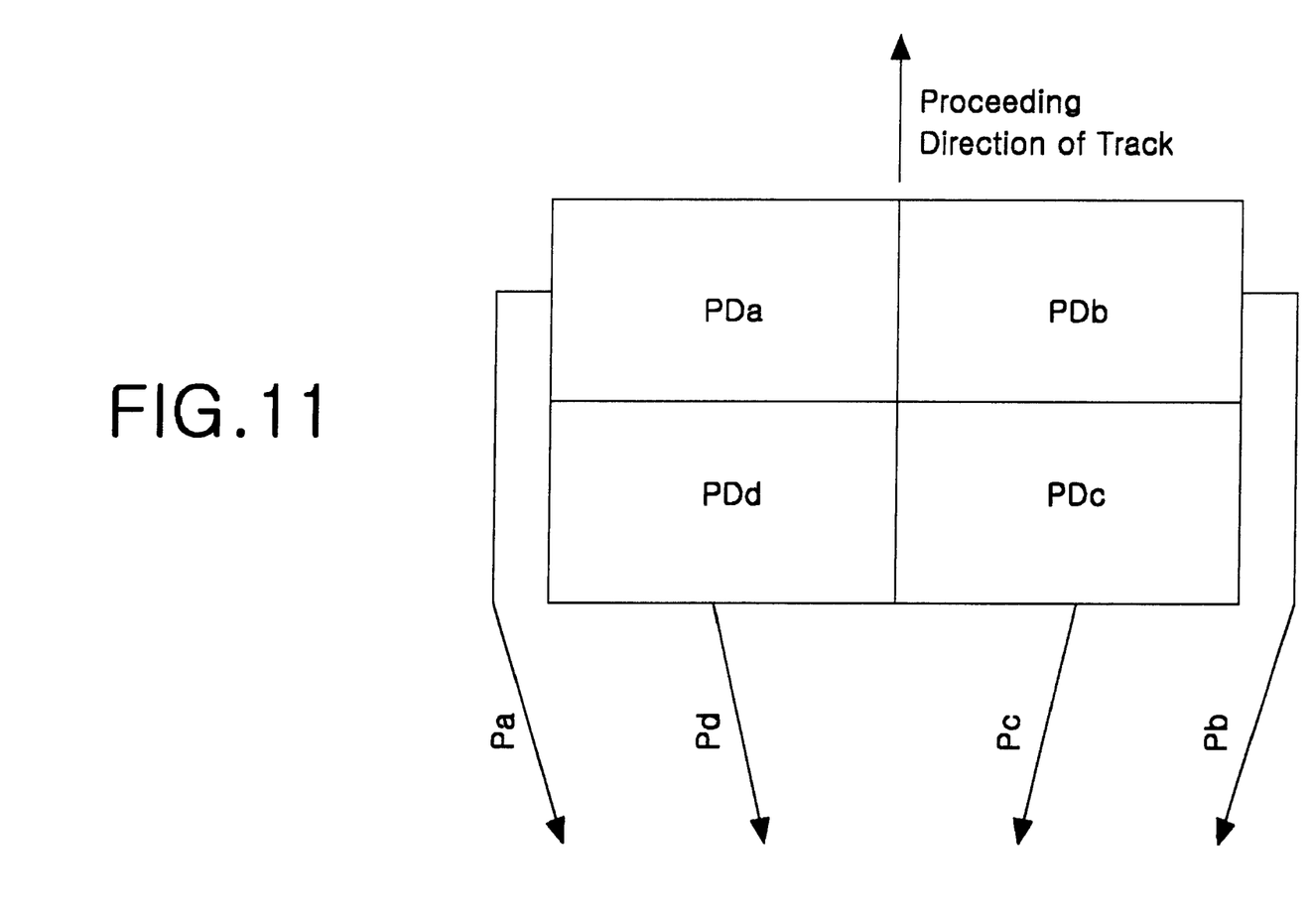
FIG. 11 is a detailed view of the photo detector shown in FIG. 10.

Referring now to FIG. 10, there is shown a conventional information recording/reproducing apparatus for accessing the optical disc in FIG. 1 and FIG. 2. A process of accessing the optical discs according to embodiments of the present invention using this information recording/reproducing apparatus will be explained below. In FIG. 10, the information recording/reproducing apparatus includes a spindle motor 42 for rotating an optical disc 40, an optical pickup 44 for accessing the optical disc 40 and a signal detector 46 connected, in series, to the optical pickup 44. The optical pickup 44 irradiates a light beam onto land or groove signal tracks of the optical disc 40, that is, onto the land or groove signal tracks 20 or 22 as shown in FIG. 3, or the land or groove signal tracks 30 or 32 as shown in FIG. 8, thereby writing an information into the land or groove signal tracks, or reading out the information written into the land or groove signal tracks. To this end, the optical pickup 44 includes a beam splitter BS for guiding a light beam from a laser diode LD to an objective lens OL and a light beam from the objective lens LD to a photo detector PD, and an actuator AC for moving the objective lens to the up, down, left, and right to perform a focusing and a tracking. The objective lens OL converges a light beam directing the beam splitter BS to the optical disc 40. The beam splitter BS allows a light beam from the laser diode LD to be irradiated, via the objective lens OL, onto the land signal track or the groove signal track of the optical disc 40, and allows a light beam reflected by the optical disc 40 to be progressed to the photo detector PD. The actuator AC moves the objective lens OL in the up and down direction, thereby irradiating a light beam onto the surface of the land or groove signal track in a spot shape. Also, the actuator AC moves the objective lens OL in the left and right direction, thereby tracing a light beam along the center line of the land or groove track. The photo detector PD converts a quantity of the reflective light received, via the objective lens OL and the beam splitter BS, from the optical disc 40 into an electrical signal. As shown in FIG. 11, the photo detector PD consists of four photo detecting pieces PDa to PDd so that it can detect a distribution of the light irradiated onto the signal tracks 20 and 22. The four light detecting pieces PDa to PDd are positioned such that they correspond to each other for two pieces on a basis of the progressing direction of the signal track. In other words, the first and fourth light detecting pieces PDa and PDd are positioned at the outer circumference or the inner circumference on the basis of the progress direction of the signal track; while the second and third light detecting pieces PDb and PDc are positioned at the inner circumference or the outer circumference, respectively. The signal detector 46 detects a wobbling signal W, a focusing error signal Fe, a tracking error signal Te and a radio frequency signal RF included in first to fourth electrical signals Pa to Pd. The wobbling signal W, the focusing signal Fe, the tracking error signal Te and the radio frequency signal RF are obtained by calculating the first to fourth electrical signals Pa to Pd by the following equations:

$$W = (Pa+Pd) - (Pb+Pc) \quad (1)$$

$$Fe = (Pa+Pc) - (Pb+Pd) \quad (2)$$

$$Te = \int [(Pa+Pd) - (Pb+Pc)] dt \quad (3)$$

$$RF = Pa+Pb+Pc+Pd \quad (4)$$

When an optical disc shown in FIG. 3 is recorded or reproduced, the wobbling signal W includes a same-phase wobbling component detected from a region in which each side of the land or groove track 20 or 22 is wobbled in the same phase, and a different-phase wobbling component detected from a region in which each side of the land or groove track 20 or 22 is wobbled in a different phase. Otherwise, when an optical disc shown in FIG. 8 is recorded or reproduced, the wobbling signal W includes a same-phase wobbling component detected from a region in which each side of the land or groove track 30 or 32 is wobbled in the same phase, a different-phase wobbling component detected from a region in which each side of the land or groove track 30 or 32 is wobbled in the different phase, and a pre-wobbling and post-wobbling components detected from each of the pre-wobbling area 34C and post-wobbling area 34D in which each side of the land and groove signal tracks 30 and 32 is wobbled in the same phase.

A focusing servo 68 included in the information recording/reproducing apparatus responds to the focusing error signal Fe from the signal detector 66 to control a voltage or a current supplied to the actuator Ac, thereby moving the objective lens OL in the vertical direction by means of the actuator Ac. By moving the objective lens OL in the vertical direction, a spot-shaped light beam is irradiated onto the land or groove track of the optical disc 60. Likewise, a tracking servo 70 responds to the tracking error signal Te to control a voltage or a current supplied to the actuator Ac, thereby moving the objective lens Ol in the horizontal direction by means of the actuator Ac. By moving the objective lens OL in the horizontal direction, a light beam irradiated onto the optical disc 40 traces the land or groove track.

The information recording/reproducing apparatus includes a reproducing information processor 52 receiving the radio frequency signal RF from the signal detector 46, and a recording clock/identification code detector 54 receiving the wobbling signal W from the signal detector 46. The reproducing information processor 52 detects a channel bit stream from the radio frequency signal RF and decodes the channel bit stream, thereby reproducing an information recorded on the land or groove signal track 20 or 22 shown in FIG. 3, or recorded on the land or groove signal track 30 or 32 shown in FIG. 8. The information generated in the reproducing information processor 42 is output to an output line 41. Meanwhile, the recording clock/identification code detector 44 detects a recording clock SCLK, an identification code ID including an address, etc. indicating the physical position of the frame, and a rotation speed information indicating a rotation speed of the optical disc 40. When the optical disc 40, in which the same-phase and different-phase wobbling area 24A and 24B are formed as shown in FIG. 3, is recorded or reproduced, or when the optical disc 40, in which the same-phase and different-phase wobbling area 34A and 34B and pre-wobbling and post-wobbling signals 34C and 34D are formed as shown in FIG. 8, is recorded or reproduced, the recording clock/identification code detector 74 detects the recording clock SCLK, the identification code ID and the rotation speed information from the same-phase component included in the wobbling signal W and the pre-synchronous and post-synchronous patterns from each of the pre-wobbling and post-synchronous components. Otherwise, when a different-phase wobbling component is input, the recording clock/identification code detector 54 indicates the generation of error. Meanwhile, the recording information processor 56 makes a blocking of a recording information input from the input line 43 into a frame size and adds the identification code ID to each blocked information, thereby producing a channel bit stream.

Further, the recording information processor 56 transfers the channel bit stream to a light controller 58 in conformity to the recording clock SCLK from the recording clock/identification code detector 54. Then, the light controller 58 intermits a light beam generated at the laser diode LD in accordance with a logical value of the channel bit stream from the recording information processor 76, thereby recording the channel bit stream on the signal track of the optical disc 40, i.e., the land or groove signal track 20 or 22 in FIG. 3, or the land or groove signal track 30 or 32 in FIG. 8.

The information recording/reproducing apparatus includes a rotation control signal generator 60 and a motor driver 62 that are connected, in series, between the recording clock/identification code detector 54 and the spindle motor 42, and a controller 64 for controlling a recording/reproducing operation. The rotation control signal generator 60 detects a rotation speed error amount from the rotation speed information from the recording clock/identification code detector 54 and controls a voltage level or a current amount of the rotation control signal applied to the motor driver 62 in accordance with the detected rotation speed error amount. Then, the motor driver 62 accelerates or decelerates the rotation speed of the spindle motor 42 in accordance with a voltage level or a current amount of the rotation speed signal from the rotation speed signal generator 60. By accelerating or decelerating the rotation speed of the spindle motor 42, a play speed in the signal track of the optical disc 40 is maintained constantly. The controller 64 controls the operation state of the focusing servo 48 and the tracking servo 50. Also, the controller 64 operates the recording information processor 56 and the reproducing information processor 52 selectively in a recording/reproducing mode and control the light controller 58 in accordance with the recording/reproducing mode, thereby controlling an intensity of a light beam generated at the laser diode LD. As described above, when an optical disc, in which the same-phase wobbling area 24A and the different-phase wobbling area 24B are formed as shown in FIG. 3, is accessed, or when an optical disc, in which the same-phase wobbling area 34A, the different-phase wobbling area 34B and the pre-wobbling and post-wobbling areas 34C and 34D are formed as shown in FIG. 8, is accessed, the information recording/reproducing apparatus detects the identification code, the recording clock and the rotation speed information from the same-phase component in the wobbling signal W and processes the different-phase wobbling component as errors. Accordingly, the information is recorded the information at all of the same-phase and the difference-phase wobbling areas in the optical disc as shown in FIG. 3 and FIG. 8, by the information recording/reproducing apparatus. Further, when an optical disc, in which the same-phase wobbling area 34A, the different-phase wobbling area 34B and the pre-wobbling and post-wobbling areas 34C and 34D are formed as shown in FIG. 8, is accessed, the information recording/reproducing apparatus performs rapidly and accurately the recording and reproducing of the information on the basis of the synchronous patterns detected from each of the pre-wobbling area 34C and the post-wobbling area 34D. As a result, the optical discs in which land and groove tracks are wobbled as shown in FIG. 3 and FIG. 8, can be accessed by the conventional information recording/reproducing apparatus. Furthermore, the optical discs in which the wobbling areas as shown in FIG. 3 and FIG. 8 are formed in the land and groove signal tracks are changeably used for the existing optical discs in which the wobbling areas as shown in FIG. 1 and FIG. 2 are formed therein.

As described above, in the recording medium according to the present invention, the same-phase wobbling area and the different-phase wobbling area are alternately arranged in each of the respective land and groove tracks, and the ID information of the address information and so on is preformatted on the same-phase wobbling area. In such recording medium, the information is recorded on all of the same-phase wobbling area and the difference-phase wobbling area by the synchronous pattern on the same-phase wobbling area so that the information is recorded in all of the land and groove signal tracks without a waste of the recordable area. Accordingly, the recording medium according to the present invention is capable of maximizing the recording capacity.

Also, since the pre-wobbling area and the post-wobbling area having the synchronous pattern are further provided, the recording medium according to the present invention can be rapidly and accurately accessed.

Although the present invention has been explained by the embodiments shown in the drawings described above, it should be understood to the ordinary skilled person in the art that the invention is not limited to the embodiments, but rather than that various changes or modifications thereof are possible without departing from the spirit of the invention. For example, although optical discs has been used in the embodiments of the present invention, it should be understood to the ordinary skilled person in the art that the present invention is applicable to an optical magnetic disc. Accordingly, the scope of the invention shall be determined only by the appended claims and their equivalents.

What is claimed is:

1. A recording medium having a signal track wobbled in a predetermined frequency, the signal track comprising:
   first wobbling area being formed by wobbling both sides of the signal track in a same phase; and
   second wobbling area being formed by wobbling both sides of the signal track in a different phase and alternating in a track direction with the first wobbling area.

2. The recording medium as claimed in claim 1, wherein the first wobbling area and the second wobbling area are alternatively arranged in width direction of the signal track.

3. The recording medium as claimed in claim 1, wherein the first wobbling area has a readable identified information and is positioned in the signal track adjacent to the second wobbling area.

4. The recording medium as claimed in claim 1, wherein the first wobbling area and the second wobbling area adjacent to each other forms an information record unit.

5. The recording medium as claimed in claim 3, wherein the second wobbling area records an information in accordance with the readable identified information preformatted on the first wobbling area.

6. The recording medium as claimed in claim 1, wherein the signal track includes:
   a land track; and
   a groove track adjacent to the land track.

7. The recording medium as claimed in claim 6, wherein:
   the recording medium is formed in disc shape; and
   the land and groove track is formed from inner circumference to outer circumference in parallel.

8. The recording medium as claimed in claim 6, wherein:
   the recording medium is formed in disc shape; and
   the land and groove track is alternatively formed by one turn.

9. The recording medium as claimed in claim 3, wherein the signal track further comprises a synchronous pattern preformatted between the first and second wobbling areas.

10. The recording medium as claimed in claim 9, wherein the synchronous pattern includes:
   first synchronous pattern being positioned between the start point of the first wobbling area and the end point of the second wobbling area; and
   second synchronous pattern being positioned between the start point of the second wobbling area and the end point of the first wobbling area.

11. The recording medium as claimed in claim 10, wherein the first and second synchronous pattern have logical values in complementary relationship, respectively.

12. The recording medium as claimed in claim 10, wherein the first and second synchronous pattern are alternatively arranged in width direction of the signal track.

13. The recording medium as claimed in claim 1, wherein the different types of wobbling signals have the same length.

14. An information recording/reproducing apparatus of performing a recording/reproducing of information for the recording medium as claimed in claim 3, wherein the information recording/reproducing apparatus proceeds the recording/reproducing of information using the identified information preformatted on the first wobbling.

15. The information recording/reproducing apparatus as claimed in claim 14, wherein the first wobbling area and the second wobbling area adjacent to the first wobbling area is treated as an information record unit.

* * * * *